US00RE50402E

(19) United States
(12) Reissued Patent
Hancock

(10) Patent Number: US RE50,402 E
(45) **Date of Reissued Patent: *Apr. 29, 2025**

(54) WALL PROTECTOR

(71) Applicant: Tate D. Hancock, Wichita, KS (US)

(72) Inventor: Tate D. Hancock, Wichita, KS (US)

( * ) Notice: This patent is subject to a terminal disclaimer.

(21) Appl. No.: 29/855,327

(22) Filed: Sep. 30, 2022

Related U.S. Patent Documents

Reissue of:
(64) Patent No.: Des. 928,603
Issued: Aug. 24, 2021
Appl. No.: 29/694,478
Filed: Jun. 11, 2019

(51) LOC (15) Cl. ..... 08-09
(52) U.S. Cl.
USPC ..... D8/402
(58) Field of Classification Search
USPC ..... D8/402, 404, 499
CPC ..... Y10T 16/6285; Y10T 16/628; Y10T 16/629; E05F 5/02; E05F 5/06; A47B 2230/0077; A47B 2230/0081; A47B 47/025; A47B 47/042; E04F 19/026; E04F 11/1804
See application file for complete search history.

(56) References Cited

U.S. PATENT DOCUMENTS

| | | | | |
|---|---|---|---|---|
| D27,468 | S | 8/1897 | Smith | |
| D28,857 | S | 6/1898 | Taplin | |
| D89,325 | S | 2/1933 | Wolfman | |
| D122,800 | S | 10/1940 | Mann et al. | |
| D235,620 | S | 7/1975 | Forseth | |
| 4,042,199 | A * | 8/1977 | Winkler | A47B 91/00 5/310 |

(Continued)

OTHER PUBLICATIONS

"Low-Profile Wall Nanny" , posted at amazon.conn , posting datevAug. 8 , 2017 , [ online ] , [ site visited Mar. 23, 2018 ] . Available from Internet , URL : https : //www.amazon.conn/dp/B073XNMDNX ( Year :2017 ).

(Continued)

*Primary Examiner* — Philip S Hyder
(74) *Attorney, Agent, or Firm* — Stinson LLP

(57) CLAIM

The ornamental design for a wall protector, as shown and described.

DESCRIPTION

FIG. 1 is a front, top isometric view of a wall protector.
FIG. 2 is a rear, bottom isometric view thereof;
FIG. 3 is a front elevational view thereof, the rear elevational view being a mirror image of FIG. 3;
FIG. 4 is a bottom plan view thereof;
FIG. 5 is a sectional view taken along the line indicated in FIG. 4;
FIG. 6 is a top plan view thereof; [and,]
FIG. 7 is a sectional view taken along the line indicated in FIG. 6[.];
*FIG. 8 is a front, top isometric view of a wall protector;*
*FIG. 9 is a rear, bottom isometric view thereof;*
*FIG. 10 is a front elevational view thereof, the rear elevational view being a mirror image of FIG. 10;*
*FIG. 11 is a bottom plan view thereof; and*
*FIG. 12 is a top plan view thereof.*
*Broken lines in dash-dash illustrate unclaimed portions of the wall protector.*
*Broken lines in dash-dot illustrate unclaimed boundary lines between claimed and unclaimed portions of the wall protector.*

1 Claim, 12 Drawing Sheets

Figure 1:
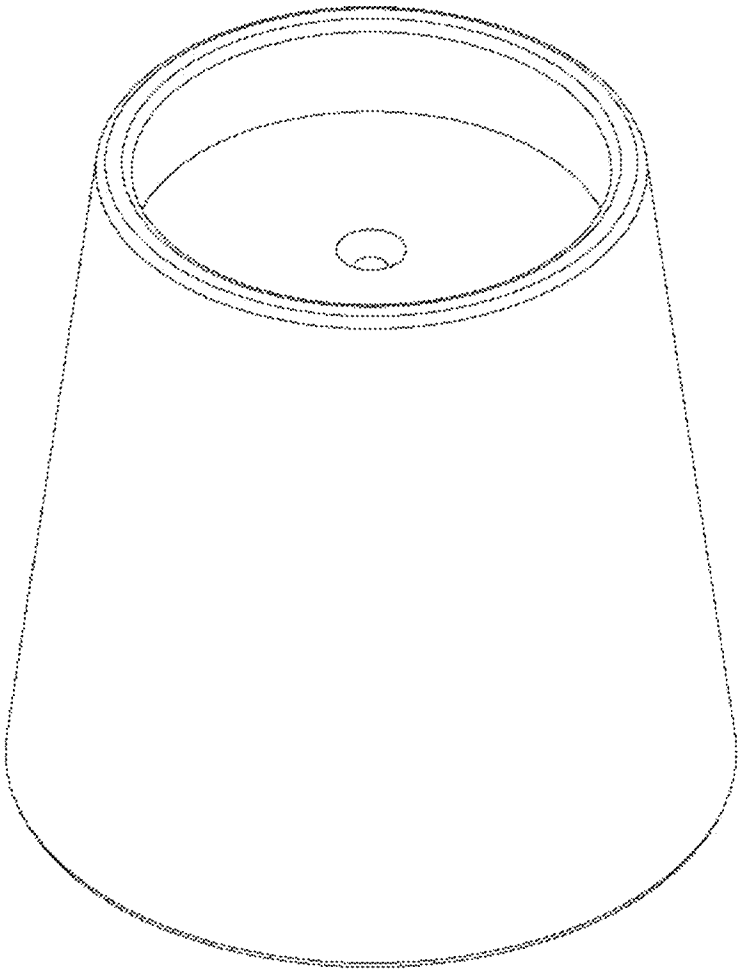
Figure 2:
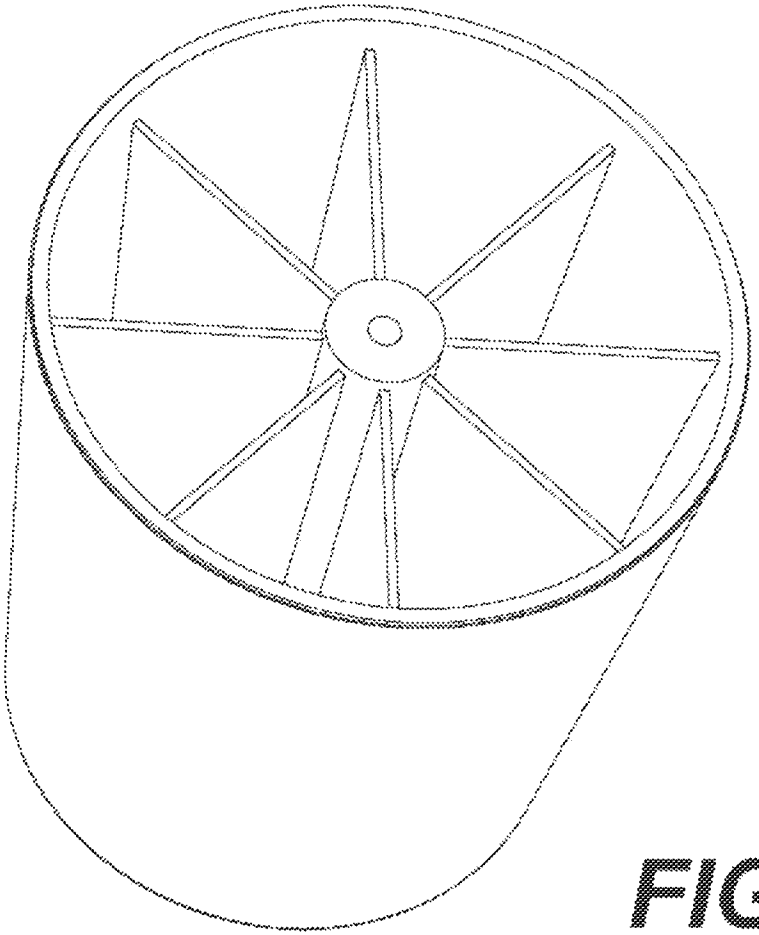
Figure 3:
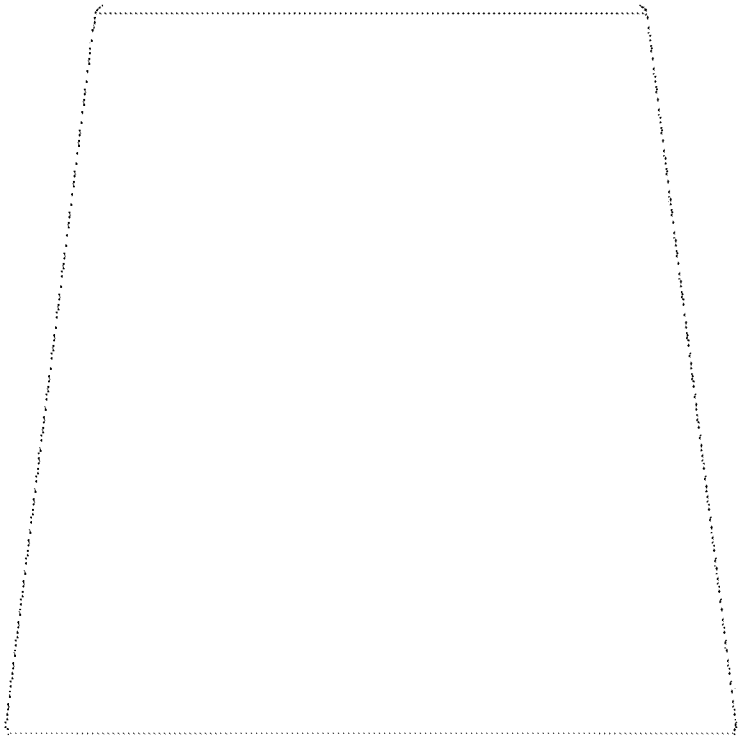
Figure 4:
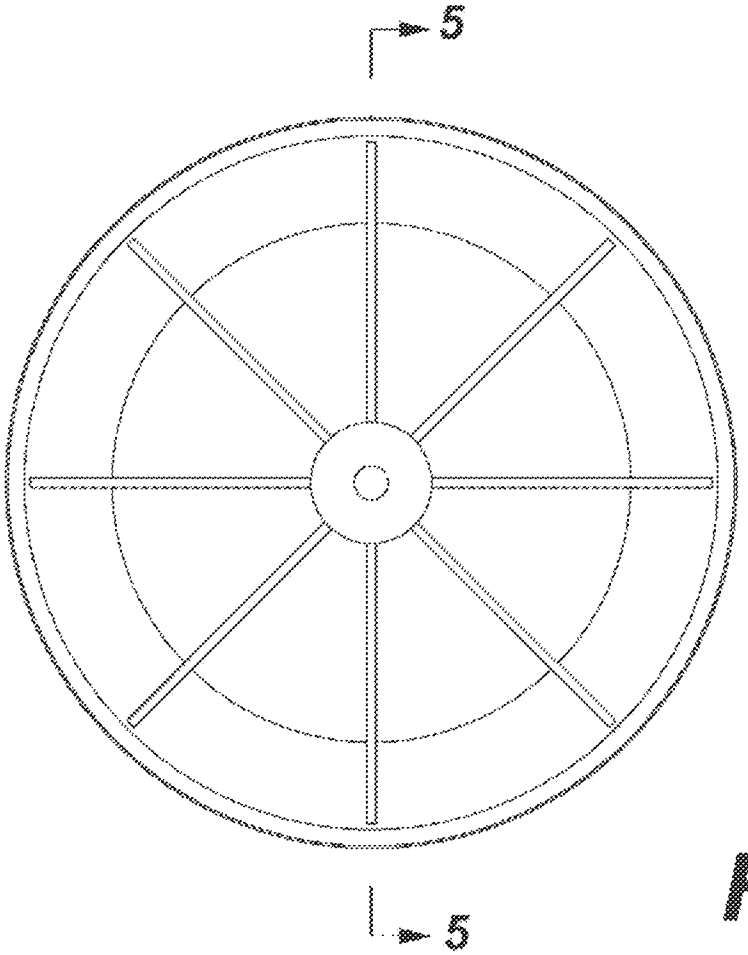
Figure 5:
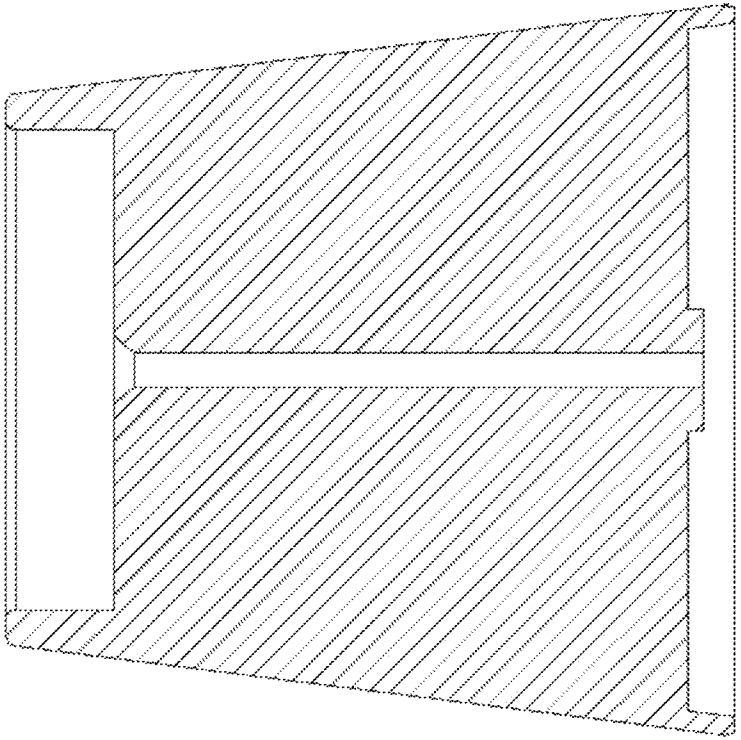
Figure 6:
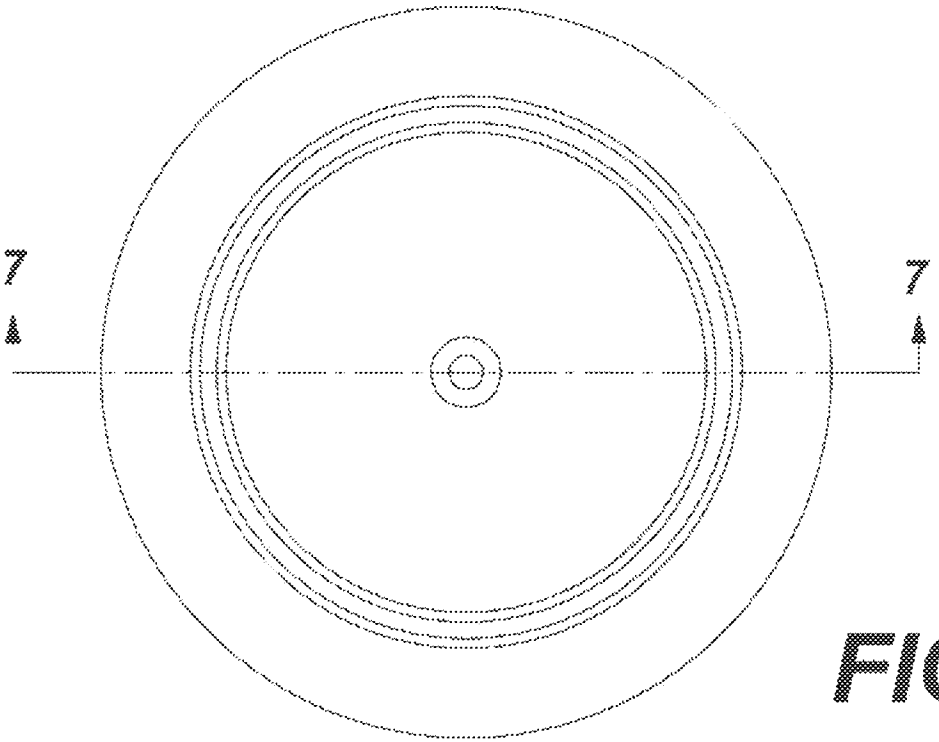
Figure 7:
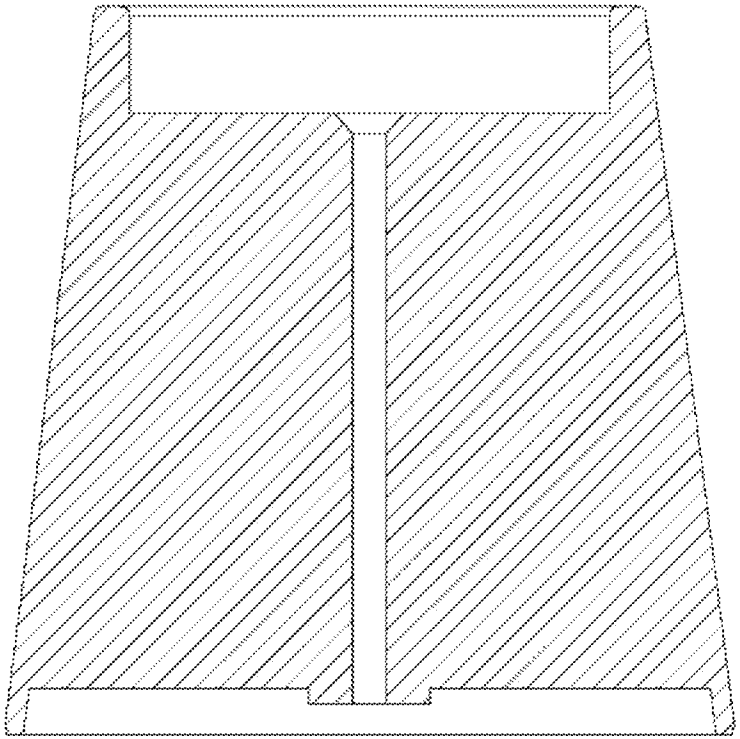

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D288,291 | S | | 2/1987 | Angle | |
| D288,525 | S | | 3/1987 | Angle | |
| 4,694,863 | A | * | 9/1987 | Klopp | F16L 57/005 138/96 R |
| D324,170 | S | | 2/1992 | Owens et al. | |
| D328,419 | S | * | 8/1992 | Brayford | E05F 5/06 D8/402 |
| D329,590 | S | * | 9/1992 | Chapman | D8/322 |
| D336,843 | S | * | 6/1993 | Hurst | D8/374 |
| D352,889 | S | | 11/1994 | Crowther et al. | |
| D366,616 | S | * | 1/1996 | Knickerbocker | D9/445 |
| D368,022 | S | | 3/1996 | Angle | |
| D379,922 | S | * | 6/1997 | Adams | D8/402 |
| D403,750 | S | | 1/1999 | Fabian | |
| D404,992 | S | * | 2/1999 | Sittig | A47B 91/00 D8/374 |
| D407,303 | S | | 3/1999 | Engberg | |
| D412,106 | S | | 6/1999 | Kennard, IV | |
| D418,745 | S | | 1/2000 | Berger | |
| D423,340 | S | * | 4/2000 | Sittig | D8/374 |
| D433,320 | S | | 11/2000 | Ware et al. | |
| D438,784 | S | * | 3/2001 | Berger | D8/402 |
| 6,295,697 | B1 | * | 10/2001 | Simon | E05F 5/02 16/86 A |
| D481,624 | S | | 11/2003 | Miskill | |
| D481,652 | S | | 11/2003 | Kamysiak | |
| D486,061 | S | * | 2/2004 | Mullins | D8/400 |
| 6,715,840 | B2 | * | 4/2004 | Martin | A47C 7/002 297/463.1 |
| D493,095 | S | * | 7/2004 | Sittig | D8/374 |
| D498,412 | S | * | 11/2004 | Pehta | D8/374 |
| 6,938,966 | B1 | | 9/2005 | Rouwhorst et al. | |
| D526,189 | S | | 8/2006 | Haymond | |
| 7,243,395 | B2 | * | 7/2007 | Haymond | E05F 5/06 16/86 B |
| D553,487 | S | | 10/2007 | Quan | |
| 7,412,751 | B2 | * | 8/2008 | Forrest | E05F 5/06 16/85 |
| D605,935 | S | * | 12/2009 | Zeyfang | D8/402 |
| D652,289 | S | * | 1/2012 | Vu | D6/709 |
| D668,138 | S | | 10/2012 | Aquil | |
| D677,149 | S | * | 3/2013 | Hammer | D8/402 |
| D683,425 | S | * | 5/2013 | Koiwa | D23/214 |
| D721,418 | S | * | 1/2015 | Koiwa | D23/214 |
| D721,419 | S | * | 1/2015 | Koiwa | D23/214 |
| D741,690 | S | | 10/2015 | Collins, IV | |
| D743,852 | S | | 11/2015 | Rouzaud | |
| D772,695 | S | | 11/2016 | Burge | |
| D772,696 | S | | 11/2016 | Burge | |
| D783,386 | S | | 4/2017 | Collins, IV | |
| D793,786 | S | * | 8/2017 | Rawls-Meehan | D6/709 |
| D799,215 | S | * | 10/2017 | Pacha | D3/318 |
| D821,191 | S | * | 6/2018 | Hancock | D8/402 |
| D829,091 | S | * | 9/2018 | Hancock | D8/402 |
| D837,638 | S | * | 1/2019 | Sargent | D8/380 |
| D837,910 | S | * | 1/2019 | Norcross | D21/715 |
| D862,212 | S | * | 10/2019 | Moriarty | D8/374 |
| D889,941 | S | * | 7/2020 | McCoy | D8/354 |
| D890,598 | S | * | 7/2020 | Chase | D8/374 |
| 2004/0129186 | A1 | | 7/2004 | Curiger | |
| 2004/0221539 | A1 | | 11/2004 | Rouail | |
| 2008/0135567 | A1 | | 6/2008 | McGee | |
| 2010/0132161 | A1 | * | 6/2010 | Vu | E05F 5/08 16/404 |
| 2012/0023707 | A1 | | 2/2012 | Edwards | |
| 2015/0305318 | A1 | * | 10/2015 | Moriarty | F15B 15/18 43/113 |
| 2016/0352054 | A1 | | 12/2016 | Xiang et al. | |
| 2017/0231399 | A1 | | 8/2017 | Backus, III | |
| 2020/0026150 | A1 | * | 1/2020 | Decker | G03B 11/041 |

OTHER PUBLICATIONS

"Wall Protector 2×2" , posted at hdsupplysolutions.com , posting date Internnoett, UgiRvLen : , h[t otnplsi :n/ e/ ]h , d[s suiptpe lvyissoiltuetdi Moanrs . . . c203n n, /2s0h1o8p/ ] p. /Awvaalill-apbrloet efcrtoomr2-x-2-self- adhesive-ivory-package-of-5-p807851 ( Year : 2018 ).

"Newkiton 4 Pcs/Set Wall Guard for Pressure Gates", posted at amazon.com, posting date not given, [online], [site visited Mar. 23, 2018.] Available from Internet, URL: https://www.amazon.com/dp/B01MXYINK5/ref=sspa_dk_detail_1?psc=1 (Year: 2017).

"Wall Saver for Pressure gates, 2 Pack, by Safety Innovations", www.amazon.com product search, URL: https://www.amazon.com/Wall-Saver-Pressure-Gates-Pack/dp/B00RYWO8BY/ref=sr_1_6_a_it?e=UTF8&qid=1484754901&sr=8-6&keywords=wall+saver, Jan. 18, 2017, 1-14.

Baby Gate Wall Protector, Date Visited: Apr. 20, 2021, Wall Nanny, Date Available: Apr. 20, 2021, www.wallnanny.com (Year: 2021).*

Wall Door Knob Bumpers, Date Visited: Apr. 20, 2021, D. Lawless Hardware, Date Available: Apr. 20, 2021, https://www.dlawlesshardware.com/knobbumper.html (Year: 2021).*

Wall Nanny Amazon, Date Visited: Apr. 20, 2021, Amazon, Date Available: Nov. 14, 2019, https://www.amazon.co.uk/Wall-Nanny-Extender-Extension-Stabilizes/dp/B081JB81L6 (Year: 2019).*

"Baby Gate Wall Cups", posted at amazon.com, posting date not given, [online], [site visited Mar. 23, 2018]. Aailable from Internet, URL: hhtps:www.amazon.com/Bumpers-Doorway-Baseboard-Pressure-Mounted/dp/B01L8B1RZG/ (Year: 2018).

"Baby Gate Wall Protector Cups", posted at amazon.conm, posting date not given, [online], [site visited Mar. 23, 2018]. Available from Internet, URL: https://www.amazon.com/dp/B077M5ZD8L/ (Year: 2018).

"Low-Profile Wall Nanny", posted at amazon.conn, posting date Aug. 8, 2017, [online], [site visited Mar. 23, 2018]. Available from Internet, URL: https://www.amazon.conn/dp/B073XNMDNX/ (Year: 2017).

"Pressure Gate Wall Protector with Motion Sensor LED Nightlight", positing date not given, [online], [site visited Mar. 23, 2018]. Available for internet, URL: https://www.amazon.com-Indoor-Pressure-Protector-Motion-Nightlight/B06X16WIZX (Year: 2018).

"Prime Line Hexagon Wall Protector", posted at homedepot.conn, posting date not given, [online], [site visited Mar. 23, 2018]. Available from Internet, URL: https://www.homedepot.conn/p/Prinne-Line-5-in-Hexagon-Wall-Protector-U-9140/100546208 (Year: 2018).

"Wall Nanny", posted at amazon.conn, posting date Jan. 20, 2017, [online], [site visited Mar. 23, 2018]. Available from Internet, URL: https://www.amazon.conn/VVall-Nanny-Pack-Protector-Spindles/dp/B06XK2T96P/ (Year: 2017).

"Wall Protector 2×2", posted at hdsupplysolutions.com, posting date not given, [online], [site visited Mar. 23, 2018]. Available from Internet, URL: https://hdsupplysolutions.conn/shop/p/wall-protector-2-x-2-self-adhesive-ivory-package-of-5-p807851 (Year: 2018).

* cited by examiner

FIG. 8
(NEW)
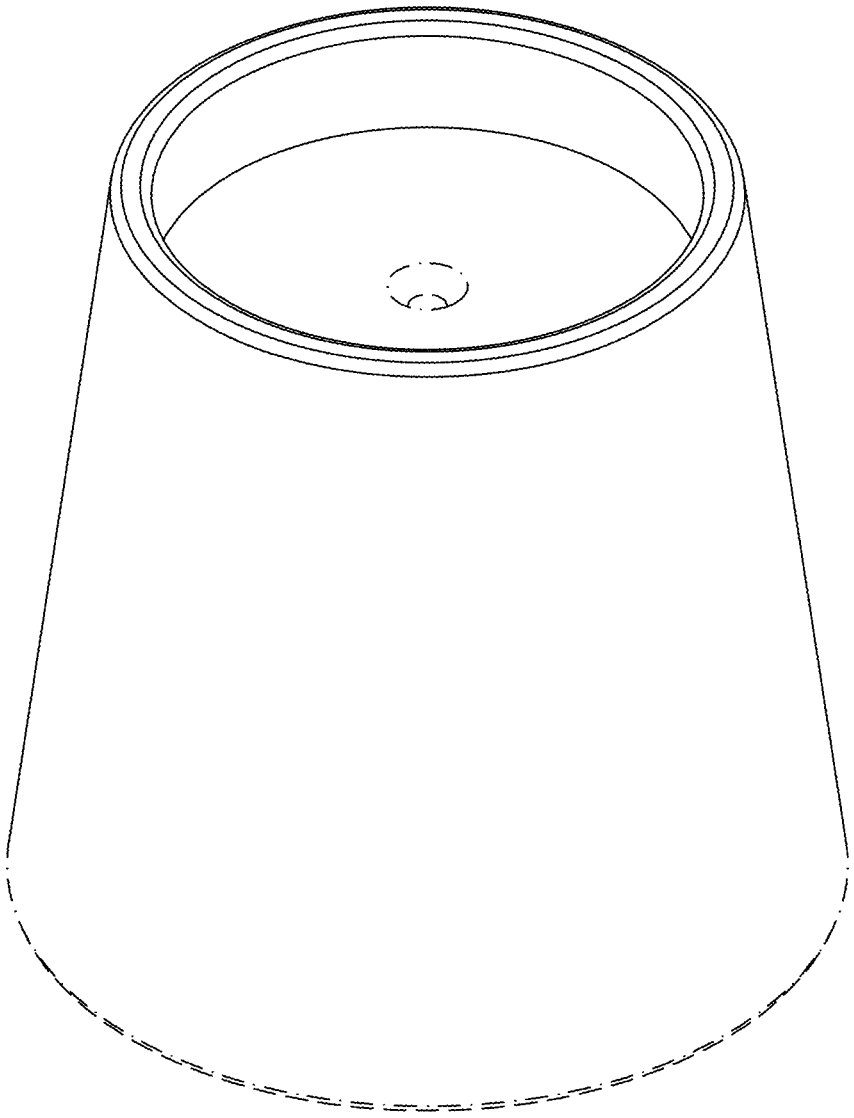

FIG. 9
(NEW)
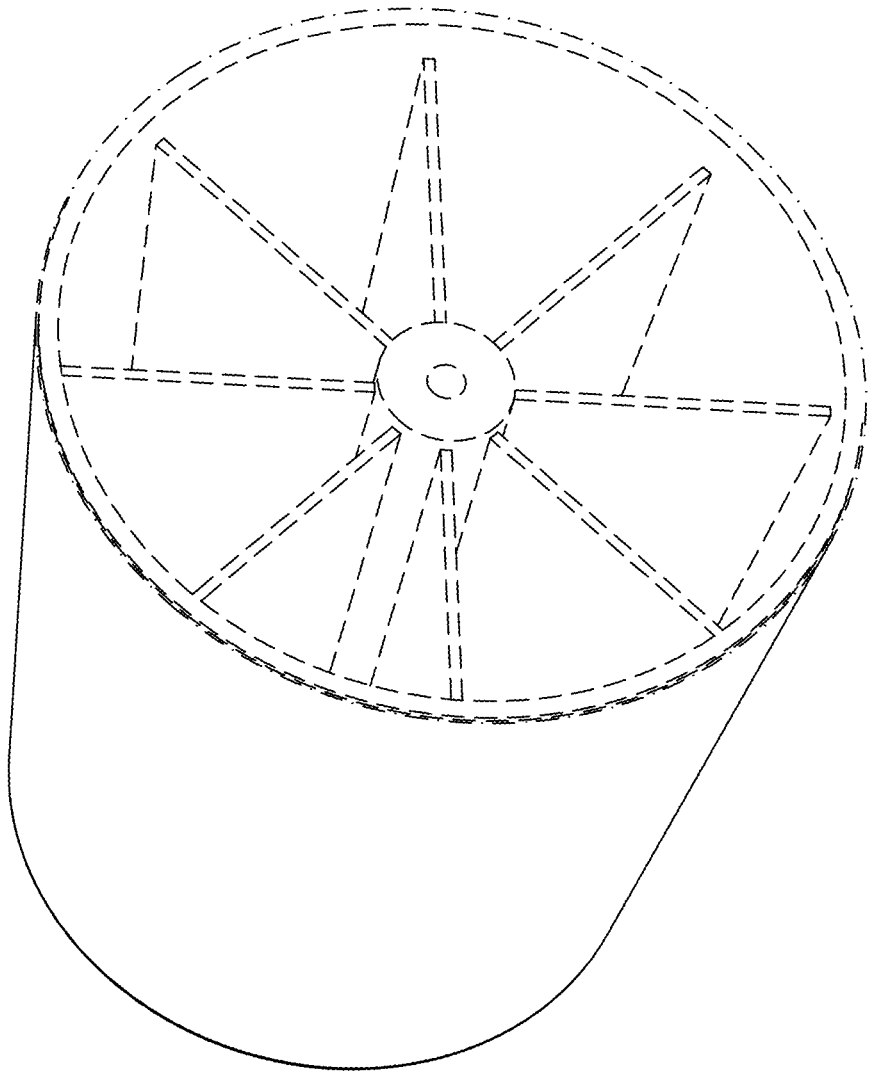

FIG. 10
(NEW)
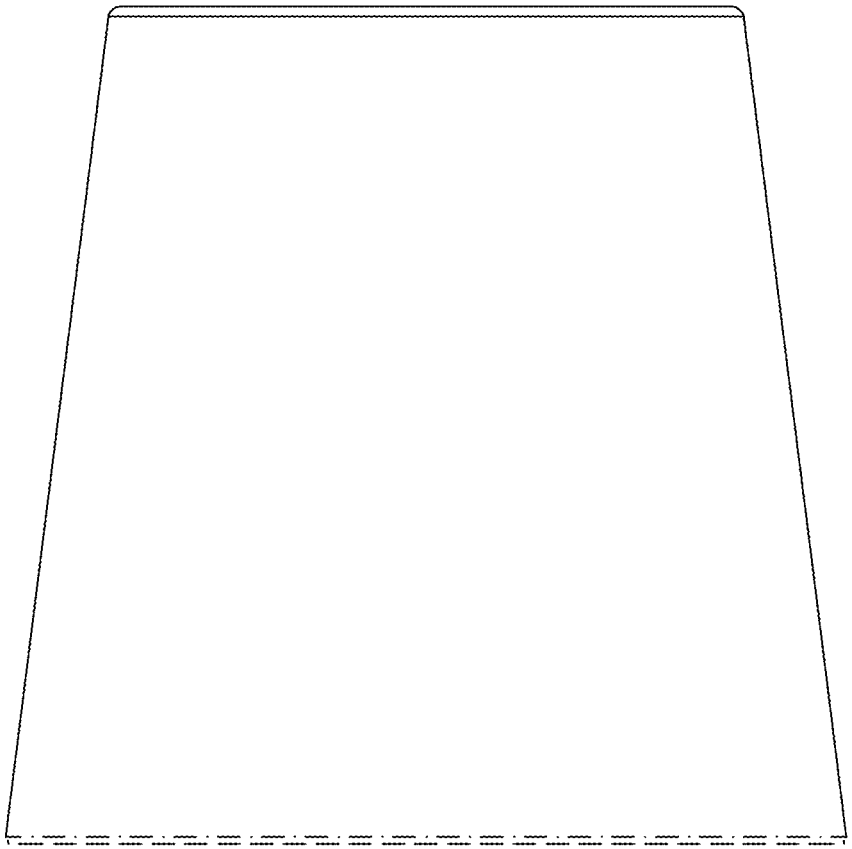

FIG. 11
(NEW)
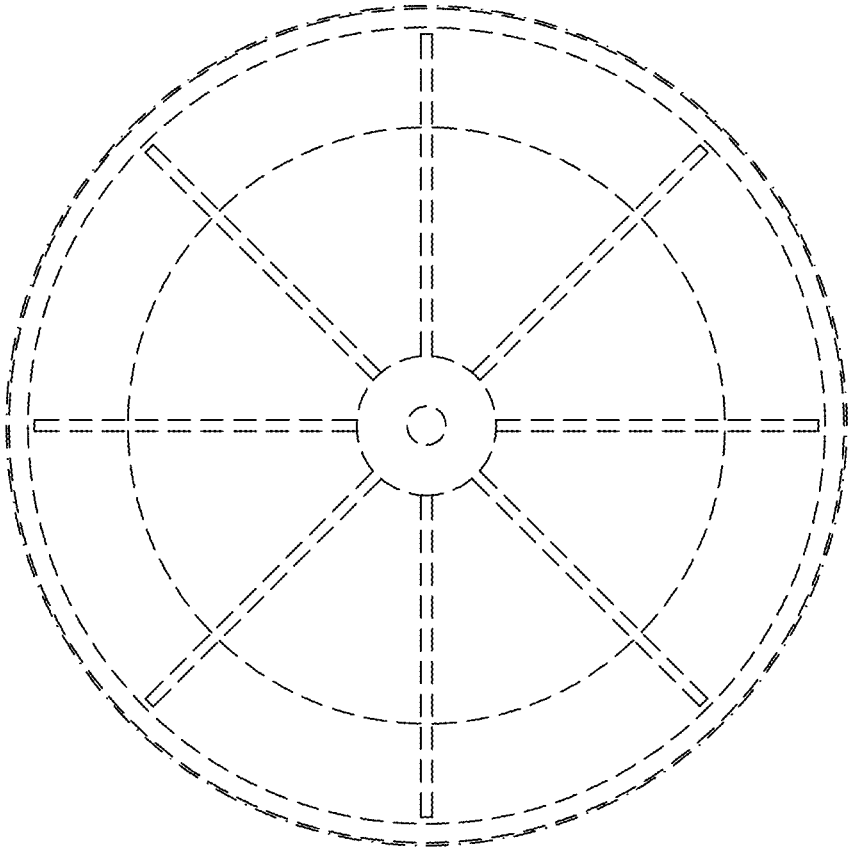

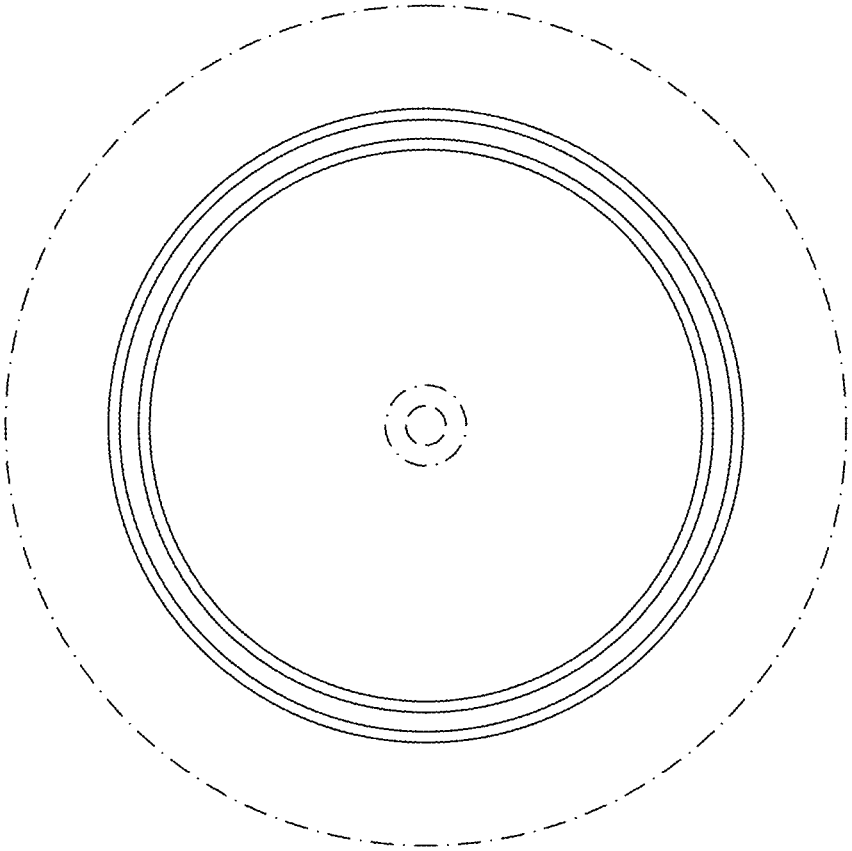

FIG. 12
(NEW)